US010776500B2

(12) United States Patent
Bugadi et al.

(10) Patent No.: US 10,776,500 B2
(45) Date of Patent: Sep. 15, 2020

(54) AUTONOMOUS HINT GENERATOR

(71) Applicant: INTERNATIONAL BUSINESS MACHINES CORPORATION, Armonk, NY (US)

(72) Inventors: Aditya V. Bugadi, Bangalore (IN); Samir M. Kamerkar, Bangalore (IN); Sreedhar Kodali, Bangalore (IN); Tirumala Mannaru, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/108,151

(22) Filed: Aug. 22, 2018

(65) Prior Publication Data

US 2020/0065506 A1    Feb. 27, 2020

(51) Int. Cl.
*G06F 21/62* (2013.01)
*G06F 21/45* (2013.01)

(52) U.S. Cl.
CPC .......... *G06F 21/6209* (2013.01); *G06F 21/45* (2013.01); *G06F 2221/2107* (2013.01); *G06F 2221/2131* (2013.01)

(58) Field of Classification Search
CPC ......... G06F 21/6209; G06F 2221/2131; G06F 21/45
See application file for complete search history.

(56) References Cited

U.S. PATENT DOCUMENTS 5,425,102 A    6/1995  Moy
8,453,258 B2 *  5/2013  Weisberger .......... G06F 21/10
                                                    726/20
9,524,395 B2 * 12/2016 Selander .............. G06F 21/46
9,608,822 B2    3/2017  Lochmatter et al.
10,079,683 B1 * 9/2018  Chebaro .............. H04L 63/083
(Continued)

FOREIGN PATENT DOCUMENTS

WO    WO2013000150 A1    1/2013
WO    WO2016149679 A1    9/2016

OTHER PUBLICATIONS

Peter Mell et al, The NIST Definition of Cloud Computing, National Institute of Standards and Technology, Publication 800-145, 2011, entire document.

(Continued)

*Primary Examiner* — Lynn D Feild
*Assistant Examiner* — Viral S Lakhia
(74) *Attorney, Agent, or Firm* — Patrick J. Daugherty; Daugherty & Del Zoppo Co. LPA

(57) ABSTRACT

Embodiments define a secure code hint generator that determine an occurrence of security word text content within electronic message body text that is descriptive of a security token required to open a secured file referenced by the message. The embodiments distinguish a security phrase subset words of the body text content from a remainder of an entirety of the body text content that include the security word content as a function of determining that the security phrase is more related to describing the security token; generate hint text content that differs from the security phrase and is chosen to reveal the security phrase text content to a user as a function of knowledge of user profile data; and associate the hint to the secured file for display to the user in response to a request for access to the secured file.

17 Claims, 7 Drawing Sheets

(56) References Cited

U.S. PATENT DOCUMENTS

| | | | |
|---|---|---|---|
| 10,423,775 B1* | 9/2019 | Kane-Parry | G06F 21/46 |
| 10,540,492 B1* | 1/2020 | Norris, III | G06F 21/36 |
| 2008/0184035 A1 | 7/2008 | Iyer et al. | |
| 2009/0046858 A1 | 2/2009 | Iyer et al. | |
| 2009/0150388 A1 | 6/2009 | Roseman et al. | |
| 2014/0137219 A1* | 5/2014 | Castro | H04L 67/02 726/6 |
| 2014/0289870 A1 | 5/2014 | Goran et al. | |
| 2015/0052355 A1 | 2/2015 | Munshi et al. | |
| 2015/0270974 A1 | 3/2015 | Thomas et al. | |
| 2017/0078321 A1* | 3/2017 | Maylor | H04L 51/046 |
| 2019/0052551 A1* | 2/2019 | Barczynski | H04L 41/046 |
| 2019/0213342 A1* | 7/2019 | Acharya | G06F 40/106 |
| 2019/0325028 A1* | 10/2019 | Palanichamy | G06F 40/30 |

OTHER PUBLICATIONS

Russell Smith, Petri IT Knowledgebase, Manage Documents with Windows Explorer using Tags and File Properties, 2015, entire document.

Microsoft, Modifying information that is displayed in File/Folder Pop-Up Descriptions, 2018, entire document.

Microsoft, Configure an Open With Item, 2013, entire document.

* cited by examiner

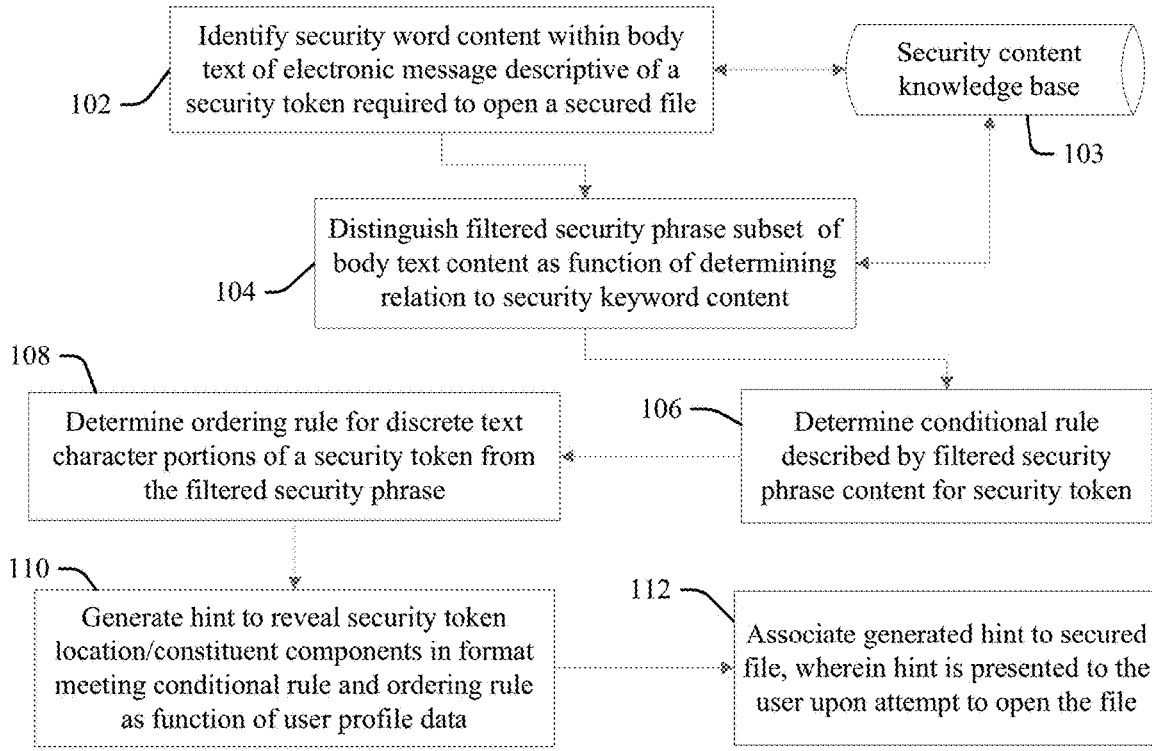

Please enter any one of the following options as a password, to view your e-mail account statement   122b —   122c —

You require an 8-character password. The first four letters of your password are the first 4 letters of the title of your account, followed by your date and month of birth OR date and month of incorporation in case of current account (in DDMM format). The password is case-sensitive (lowercase). Please do not include any special characters, spaces, or salutations (if any). In case of joint account, the details of the first account holder need to be entered in the above mentioned format.

AUTONOMOUS HINT GENERATOR

BACKGROUND

Encrypted or password-protected files are commonly sent to recipients as attachments to electronic messages (for example, emails, Simple Message Service (SMS) texts, chats, etc.), or referenced within the body content (for example, wherein the file may be sent by another message, or accessed by a portal or link, etc.) Such secured files may only be opened, and their contents otherwise protected from disclosure or discovery revealed, via application or use of an appropriate unique security data item. Illustrative but not limiting or exhaustive examples of security data items include a confidential alphanumeric password, a cookie file generated and saved to a device used by the recipient to open the file, a private or public key generated during encryption of the file, and still others will be apparent to one skilled in the art. Once an attachment file is downloaded and saved to an archive accessible to the recipient, (for example, to a local, network or cloud-based memory device, service or resource), the recipient or other user may subsequently retrieve and open the file via entry of the appropriate security data item into an appropriate application configured to open the file and reveal the confidential contents.

SUMMARY

In one aspect of the present invention, a computerized method for a secure code hint generator includes executing steps on a computer processor. Thus, a computer processor is configured to determine an occurrence of security word text content within body text content of an electronic message, wherein the security word text content is descriptive of a security token that is associated with a secured file that is referenced by the electronic message, wherein the security token is required to open the secured file. The configured processor distinguishes a subset ordered plurality of words of the body text content comprising the security word content from a remainder of an entirety of the body text content as a security phrase, as a function of determining via natural language processing that the security phrase is more related to describing the security token than the remainder body text content; generates a hint comprising text content that differs from the security phrase and is chosen to reveal the security phrase text content to a user as a function of a knowledge context defined by user profile data; and associates the generated hint to the secured file for display to the user in response to a user request for access to the secured file.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine an occurrence of security word text content within body text content of an electronic message, wherein the security word text content is descriptive of a security token that is associated with a secured file that is referenced by the electronic message, wherein the security token is required to open the secured file. The configured processor distinguishes a subset ordered plurality of words of the body text content comprising the security word content from a remainder of an entirety of the body text content as a security phrase, as a function of determining via natural language processing that the security phrase is more related to describing the security token than the remainder body text content; generates a hint comprising text content that differs from the security phrase and is chosen to reveal the security phrase text content to a user as a function of a knowledge context defined by user profile data; and associates the generated hint to the secured file for display to the user in response to a user request for access to the secured file.

In another aspect, a computer program product for a secure code hint generator has a computer-readable storage medium with computer readable program code embodied therewith. The computer readable hardware medium is not a transitory signal per se. The computer readable program code includes instructions for execution which cause the processor to determine an occurrence of security word text content within body text content of an electronic message, wherein the security word text content is descriptive of a security token that is associated with a secured file that is referenced by the electronic message, wherein the security token is required to open the secured file. The processor is further caused to distinguish a subset ordered plurality of words of the body text content comprising the security word content from a remainder of an entirety of the body text content as a security phrase, as a function of determining via natural language processing that the security phrase is more related to describing the security token than the remainder body text content; generate a hint comprising text content that differs from the security phrase and is chosen to reveal the security phrase text content to a user as a function of a knowledge context defined by user profile data; and associate the generated hint to the secured file for display to the user in response to a user request for access to the secured file.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 4 is a flow chart illustration of an embodiment of the present invention.

FIG. 5 is a graphic illustration of message body text according to the present invention.

DETAILED DESCRIPTION

Figure 1:
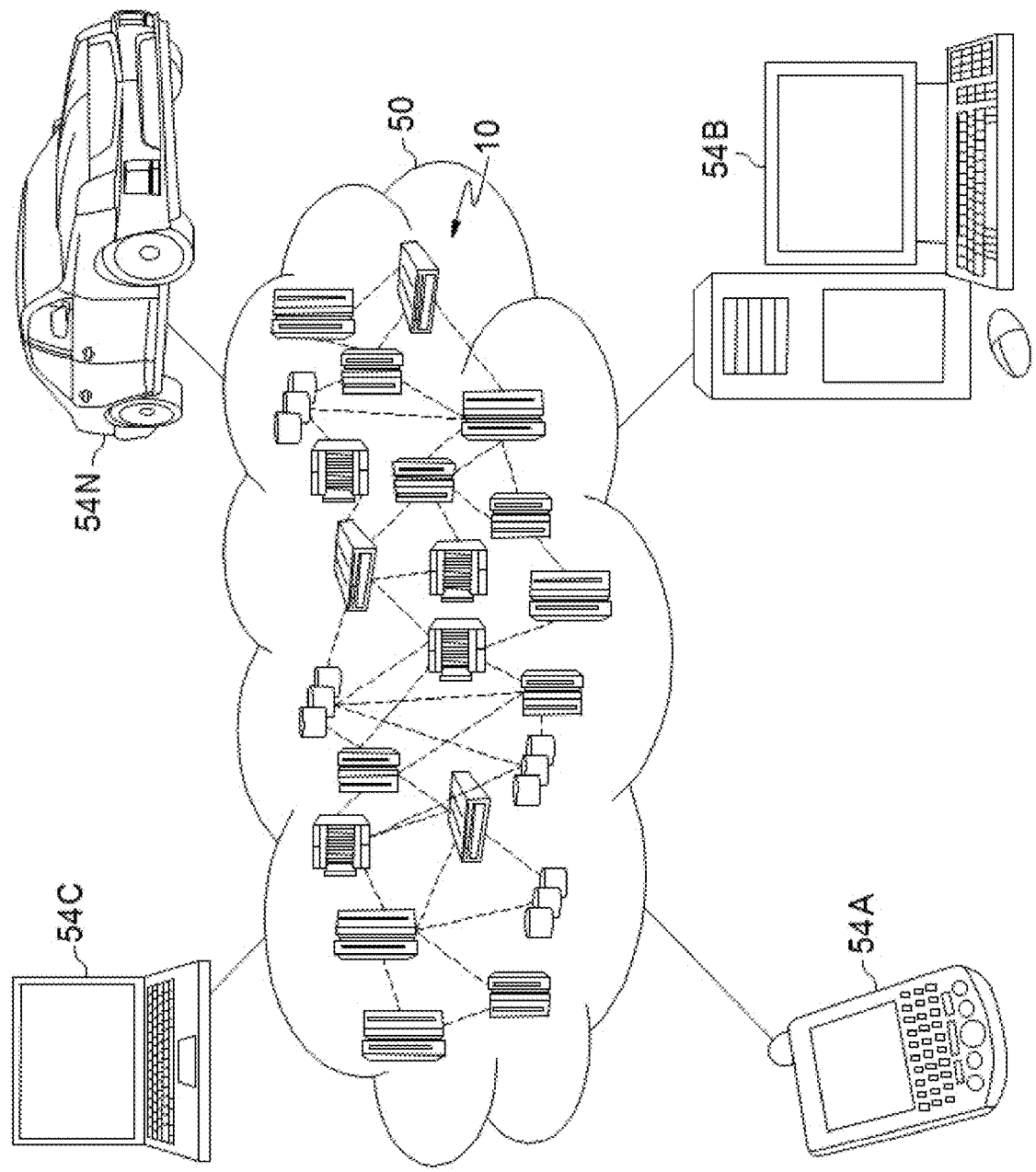
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
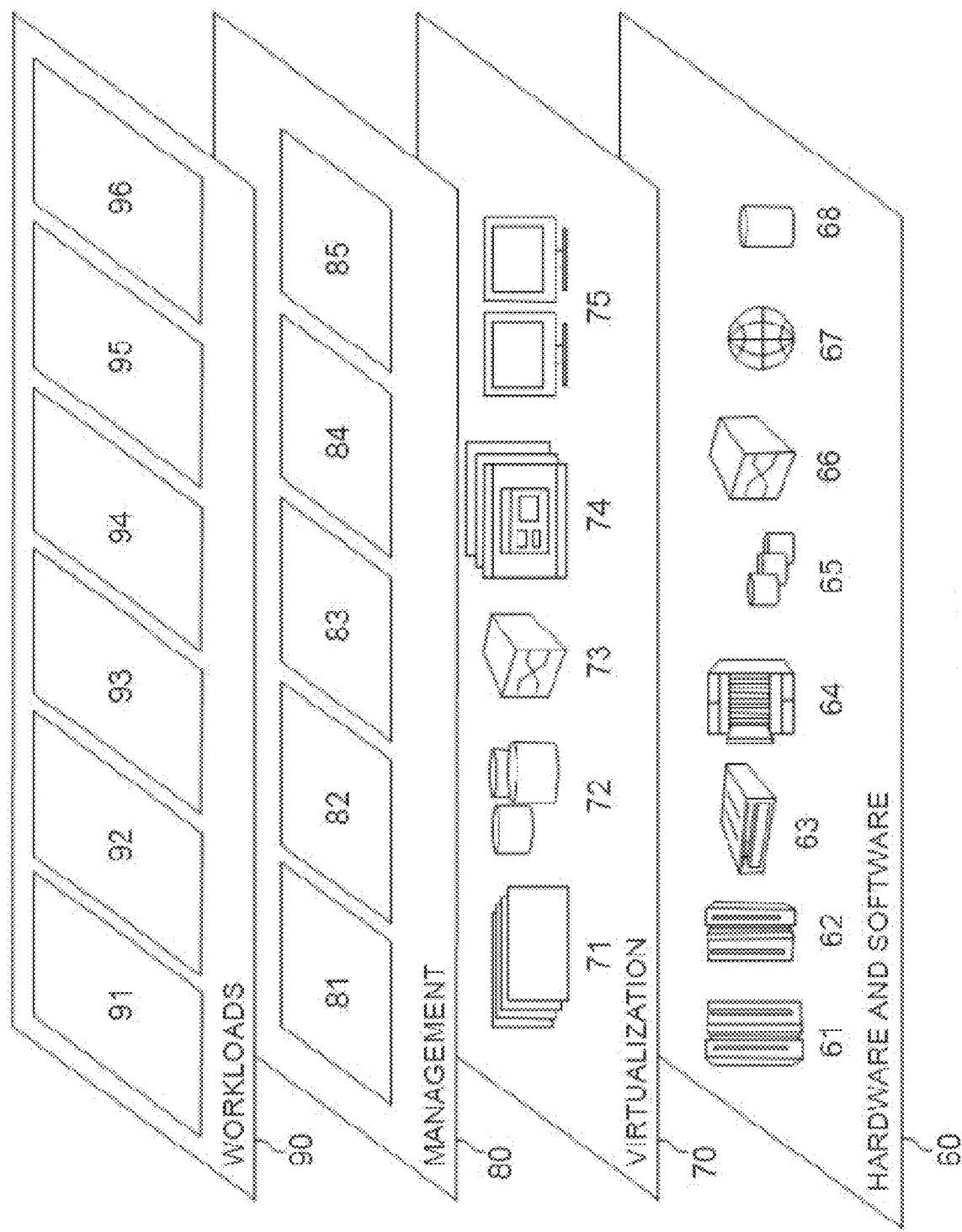
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a secure code hint generator according to embodiments of the present invention 96.

Figure 3:
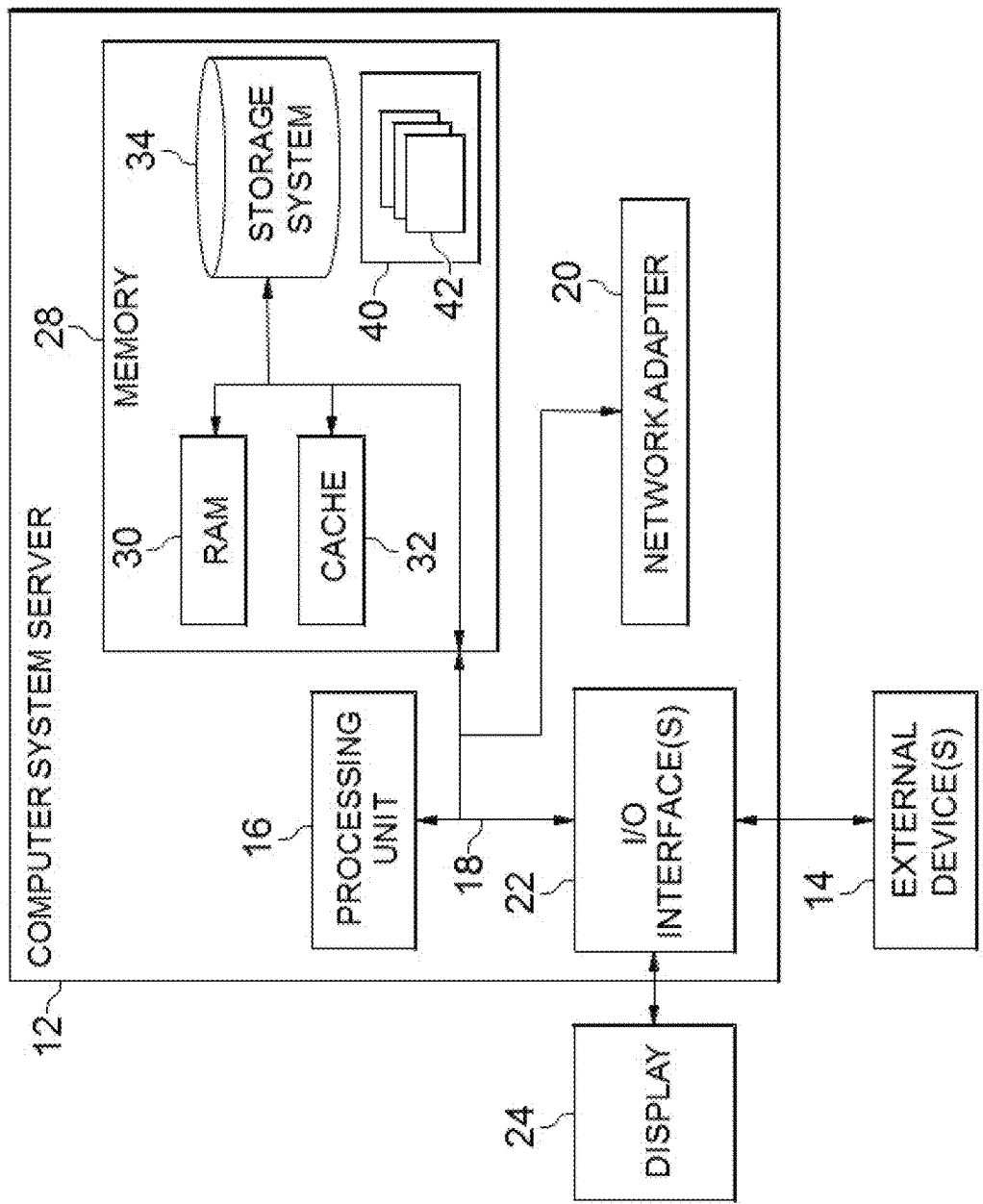
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a secure code hint generator according to embodiments of the present invention. A processor (for example, a central processing unit (CPU)) executes code (such as code installed on a storage device in communication with the processor) and is thereby configured according to the present invention (a "configured processor") at 102 to determine, parse or otherwise identify the presence of security word content (a keyword, phrase or other group of words) within the body text content of an electronic message (email, Simple Message Service (SMS) text message, chat message, etc.) that is descriptive of a security token (a password, a cookie, an encryption key location, etc.) that is required to open a secured file attached to or referenced by the message (for example, a password protected or encrypted file, etc.). The identification may be made through comparison to a knowledge base repository 103 database or other corpus of security content (text words or phrases) that are known or otherwise pre-determinized as concerning password or security issues. Illustrative but not limiting or exhaustive examples of knowledge base security keywords and phrases include "password," "token," cookie," "secure," "open," "to open the file", and still other keywords or key phrases that are known to be indicative of descriptive information of a security token or process required to open the file will be apparent to one skilled in the art.

At 104 the configured processor distinguishes and filters out a subset ordered plurality of words of the entirety of the body text content as a filtered "security phrase" subset of the greater, encompassing body content, as a function of determining a relation or association to the knowledge base security keyword via Natural Language Processing (NLP) mechanisms, a stronger relation to the security content than the remainder of the body text content (and optionally as a function of comparison to the knowledge base security content 103 database). Distinguishing the filtered security phrase subset includes defining an ordered grouping of words (a phrase, sentence, group of words within a threshold word distance from a keyword, etc.) as demarcated by punctuation formatting (for example, an indented paragraph). Content and context analysis from Natural Language Processing (NLP) mechanisms determine the extent or size of the security phrase subset as a function of one or more of text string character recognition, punctuation, dominant subject context, context defined by neighboring words both within the filtered security phrase and excluded and distinguished from the phrase, etc.

Thus, embodiments at 104 compare distinct groups of letters separated by spacing and punctuation to dictionary, article, subject area and other database entries to recognize relationships between known words and categorize them into related groups of word, discrete phrases, etc., as a function of likely sentence structures (subject-predicate, noun-verb-object, etc.), including as demarcated by punctuation marks (for example, a string beginning after an occurrence of a period, colon, semicolon, comma, question mark, etc., and ending with another occurrence of different punctuation mark), and/or set-off by a change in dominant subject matter content (for example, a group of words containing discussion of a specific programming language feature is distinguished from another groups that discusses password usage).

At 106 the configured processor determines a conditional rule for the text content defining the security token within the filtered security phrase. The conditional rule may specify a location of a cookie or other token generated and stored after access of the secured file content (for example, "cookie will reside on the browser of your mobile device"), or define specific formatting or ordering of password content (for example, conditional statement content may include the occurrence of the phrase "case sensitive," which indicates that successful password entry is dependent on matching upper or lower case format of letters used in defining the password; or identifying a first alphanumeric character type identifier ("letter," "number," "upper case," "lower case," "special character," etc.)

At 108 the configured processor determines an ordering rule for discrete text content defining the security token within the filtered security phrase character (of different portions of a password, or location descriptors of a token). For example, the configured processor identifies that a first term description of a password ("your date of birth") is linked by a conjunction or other linking term ("and," "or,", "another," etc.) to a modifying term "different," etc.), indicating that more than one different type of character must be combined to form the password, including in a specific order. The ordering rule may include conditions, including format conditions, for a password, such as a "date" item "in month-date-year format, with year in four-digit format," or limiting ordering conditional terms such as "in month-date-year format, with year in four-digit format"; or "followed by," wherein a different, second term description appears immediately afterward (for example, "your permanent access number".)

At 110 the configured processor generates a hint for the user that is different from the security word content, does not directly reveal (comprise or contain) the content, but instead is comprised on text content that is chosen to reveal the security token location or (password) constituent components to the user as a function of knowledge context defined by user profile data, optionally in a format meeting the conditional rule determined at 106 and the ordering rule determined at 108. More particularly, at 110 the configured processor hint includes words or terms that do not directly reveal the security token content (they are not directly equivalent to the exact content of the password components, or directly reveal location data), but are understood or known to the user as a function of personal profile data and user general knowledge, including personal user term usage history, demographic data of the user, etc.

Accordingly, at 112 the configured processor associates the generated hint with (to) the secured file, so that upon a subsequent attempt by the user to open the file (or an inquiry or other graphical user interface (GUI) routine input by the user) the hint is presented to the user, in order to assist the user in remembering or decoding the password content and using the recalled/decoded password content to open the protected file. Thus, double-clicking on the file as displayed within a folder, or rolling a cursor over the file icon, etc., may evoke a pop-up window that displays the associated hint to the user, cause a sound file to recite the hint to the user, etc.

Emails and other messages containing secured file references and attachments commonly describe within the body content of the message information that reveals to the recipient the information needed to form a password for opening the secured file, such as "the password for the attachment is the last four digits of your tax identification number and your date of birth"; or describe security token generation and storage location, such as "open the attached file on your BIGCORP cell phone model OS53, or your company laptop, or within the secure company portal browser application, as the required encryption key is stored only on this device, or as a cookie within the secure company portal browser application." Embodiments of the present inventions identify and filter this phrasing content out of the entire body of message at 104 for processing by the subsequent hint generator processes, improving processing efficiencies and speed over the prior art by reducing and limiting the word content processed by NLP and other processes used in hint generation.

Password-protected or encrypted files may be downloaded and saved to an archive accessible to the recipient, (for example, to a local, network or cloud-based memory device, service or resource), wherein the recipient or other user may subsequently retrieve and open the file via entry of the appropriate security data item into an appropriate application configured to open the file and reveal the confidential contents. However, a user may forget a required password, replace or reset a personal device or lose access to a memory device upon which a requisite cookie or encryption key was stored, or otherwise fail to produce the required security data item. In this situation the protected file is rendered unopenable and the protected contents unavailable to the user, without recovery and application of an appropriate security data item to open the secured document.

Remembering and managing passwords or encryption keys for large numbers of secured file items is a tedious and sometimes difficult task under the prior art. Prior art approaches for aiding in the recall or identification of passwords includes recording password information in association with the identification or location of a protected file on a soft-copy (electronic) or hard-copy (paper, marker board, sticky-tab, etc.) document or item: this presents security problems, as unauthorized person having access to such a document or item may obtain or use the recorded information, giving them unfettered access to the file contents and thereby destroying the confidential nature of the file contents.

When a user has forgotten a password, or the identity of a device containing a requisite cookie or encryption key, in the prior art the user may try to recall the original email or mail context to identify information required for providing correct authentication to open the downloaded secured file. Users may try to review original message items that bore or referenced the secure file as an attachment, including for information within the body text of the message that included specific instructions as to password content. However, this prior art approach requires that the user is able to search for and identify the specific correspondence items within a historical archive. Searching for, finding and identifying the appropriate historic correspondence may be difficult, time-consuming if successful, but generally unsuccessful where an email archive is incomplete, or the search criteria used is erroneous. In the case of a lost or deleted email or other correspondence, under such prior art approaches a user may need to contact an originator via a new message and ask for identification of the security data item authentication details in order to open an archived, password-protected attachment file.

In contrast, embodiments of the present invention autonomously generate hints as a function of user profile data that are meaningful and understood by the user in the context of the user profile data, wherein the content or form of the hint is translated or otherwise reveals the content and format of the missing password, or key location to the user, and wherein the form or content of the hint itself does not directly convey or reveal the password or key location without application of the user profile data. For example, another person seeing the hint "your DOB in MDY-8 digits followed by your PAN" will not know the actual password unless they know the content of the "date of birth" AND the "permanent access number" items of the user. The hint may be freely revealed or shared with this other person, without compromising the password confidentiality and security (unless the user fails to maintain confidentiality of their own, personal and unique identity indicia and information).

As there is no need for a user to write down passwords for later use, security is enhanced: no more notes or "sticky tabs" attached to user workstations listing the password, avoiding the revelation of the written passwords to other, unauthorized persons who might find such written-down passwords. Users no longer need to depend on archiving messages in a searchable format and location, as the hint will reveal the location or content of the security token to the user even if the original message is deleted or otherwise inaccessible. Embodiments speed-up the file access authentication processes by eliminating the need for a user to access and search a message client to search for the specific, original message content associated with the initial receipt of a secure file.

In one example of the process of FIG. 4, at 102 the configured processor determines or identifies "password" as security word content within the body of an email message that has a password-protected file attached. At 104 the configured processor filters out a filtered security phrase ordered plurality of words including the "password" as security word content as a sentence demarcated by periods within the message body text content. At 106 the configured processor determines a conditional statement content rule for the password described by the filtered security phrase that defines specific formatting or ordering of a "date of birth" of the password content as "in month-date-year format, with year in four-digit format". At 108 the configured processor determines an ordering condition rule applicable to the password and specifies that the "date of birth" is "followed by" (immediately first in order) to an adjacent, second, different password component within the filtered security phrase: "your permanent access number." Thus, at 110 the configured processor generates the hint to comprise (i) an abbreviation for the date of birth content ("your DOB") that is known to the user as indicated by the user profile data (from data indicating that standard English is known to the user, or that the user uses "DOB" to signify "date of birth in historical messaging content), and wherein the user knows his or her own date of birth and can substitute the date data for the "DOB" text content within the hint. The hint may further included an applicable conditional statement content rule (" . . . in MDY-8 digits . . . "), the ordering rule (" . . . followed by . . . ") and an identifier of the second component of the password (" . . . your PAN."), wherein the user profile data indicates that the user is a citizen of COUNTRY A, and therefore will understand that "PAN" is an acronym for his or her, unique "permanent access number" issued to every citizen of COUNTRY A for association with government services uniquely allocated to the user (and thus the user understands to use his or her unique PAN number as the second, ordered part of the password).

Thus, in this example the entire hint generated at 110 comprises, in composite, "your DOB in MDY-8 digits followed by your PAN," wherein the user supplies the actual unique password indicia from their personal profile data.

In another example illustrated in FIG. 5, an email message with a secure PDF file attachment entitled "Account Statement.pdf" has body text secured phrase content 120 distinguished (at 104, FIG. 4) from other body text (not shown) by incorporating occurrences 122a, 122b, 122c and 122d of "password", determined (at 102, FIG. 4) to be security word content as a function of matching "password" to knowledge base security words, and/or determining that the term is related to the attachment via a reference 124 in the body text: "to view your email account statement."

The configured processor identifies and determines from the text content the conditional rules (at 106, FIG. 4) of "require an 8-character password," "the password is case sensitive (lowercase)," and "in case of joint account, the details of the first account holder need to be entered"; and an ordering rule (at 108, FIG. 4) of "the first four letters of your password are the first four letters of the title of your account, followed by your date and month of birth OR Date and month of incorporation in case of current account (in DDMM Format)." Accordingly, the configured processor generates (at 110, FIG. 4) the hint of "NAMEDDMM" to comply with the determined condition and ordering rules, wherein the user understands as a function of password conventions reflected in the user profile history data that the number of alphanumeric characters in the hint (eight) is the length of the password, that "NAME" signifies that the first four characters are the first four letters of the account title, and that "DDMM" signifies that an ordering rule requires that the next four alphanumeric characters are most-likely date and month, the first two of these four alphanumeric characters signifying the last two digits of year of birth, and the remaining two alphanumeric characters the birth month; further, the "all-caps" format of the hint signifies lower case for alpha characters, wherein under-strike font would instead signify upper case.

In another example, the body text of an email with a secured file attachment entitled "tax filing receipt.pdf" includes a first paragraph of content:

"Your Acknowledgement is attached and to open, you will need Adobe Acrobat Reader. If you do not have Adobe Acrobat reader, please visit the following link to download it: www.adobe.com/products/."; and a following, second paragraph of content:

"Your Acknowledgement is protected by a password for your security. Please enter your PAN (with letters in lower case) and Date of Birth or Incorporation (in dd/mm/yyyy format), in combination to view your acknowledgement (for example: if your PAN is AAAPA0000A and the date of birth is 10 Jan. 2008, then the password will be aapa0000a10012008)."

In this example the configured processor determines (at 104, FIG. 4) that the second paragraph is a filtered security phrase subset corpus of content distinguished from the first paragraph: by the lack of the security content word "password" within the first paragraph, in view of NLP processes recognizing that punctuation, spacing and content subject matter separate them into two different subjects. Thus, the second paragraph is processed as the filtered security phrase to determine conditional rules (at 106, FIG. 4) of "PAN letters in lower case," "Date of Birth or Incorporation (in dd/mm/yyyy format)," and an ordering rules (at 108, FIG. 4) of "enter PAN and Date of Birth or Incorporation (in dd/mm/yyyy format), in combination." Accordingly, the configured processor generates (at 110, FIG. 4) the hint of "panddmmyyy" to comply with the determined condition and ordering rules, wherein the user understands as a function of password conventions reflected in the user profile history data that "pan" in lower case signifies entry of the user's PAN number with letters entered in lower case; and the location "ddmmyyyy" immediately afterward, with no spacing, indicates that the PAN data is concatenated to the relevant tax identification date (date of birth for an individual, or date of incorporation for a corporate entity, in the indicated format: day, then month, then year, with all four year digits required.

Figure 6:
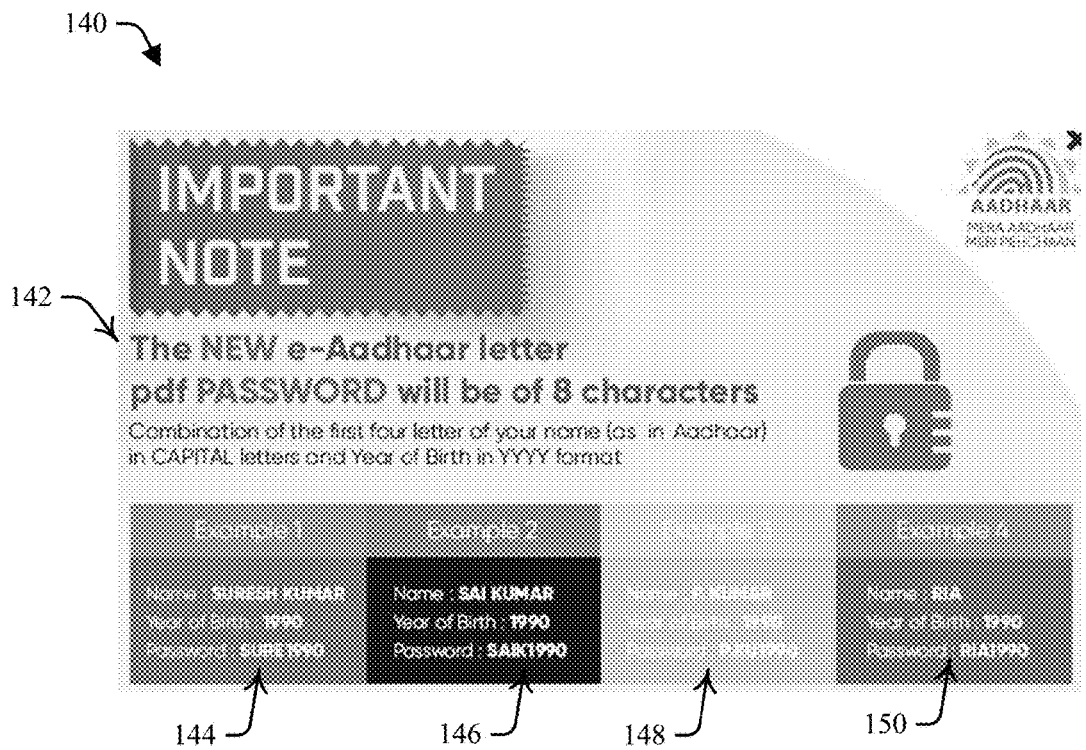
FIG. 6 is a graphic illustration of a graphical user interface window according to the present invention.

FIG. 6 is a graphic illustration of a portal window 140 displayed within a GUI display to a user, wherein the configured processor determines (at 102, FIG. 4) that body text 142 of the window 140 refers to a secured file accessible to the user via the portal ("e-Aadhaar letter.pdf") that is associated with the security word content item "password." In this example the configured processor determines conditional rules (at 106, FIG. 4) from the body text content 142 and associated examples 144, 146, 148 and 150 of "letters of name in upper case ("CAPITAL") and "year of date of birth in four-digit format;" and an ordering rule (at 108, FIG. 4) of "concatenate (combine) first four letters of combination of first and last names of the user (as indicated by each of the four examples 144, 146, 148 and 150) to a next-in-order item of year of date of birth of user." Accordingly, the configured processor generates (at 110, FIG. 4) the hint of "NAMEYYYY" to comply with the determined condition and ordering rules, wherein the user understands as a function of password conventions reflected in the user profile history data that "NAME" in upper case signifies entry of the first four letters of a combination of the first and last names of the user, wherein the upper case font indicates that the entry must be in upper case alphanumeric letters, concatenated to and followed by the year of date of birth in four-digit format, signified by the repetition of the upper case "Y" character four times, and when this convention further indicates to this user (as a function of user profile data) the birth year and not the day-month portion of the birth date.

Figure 7:
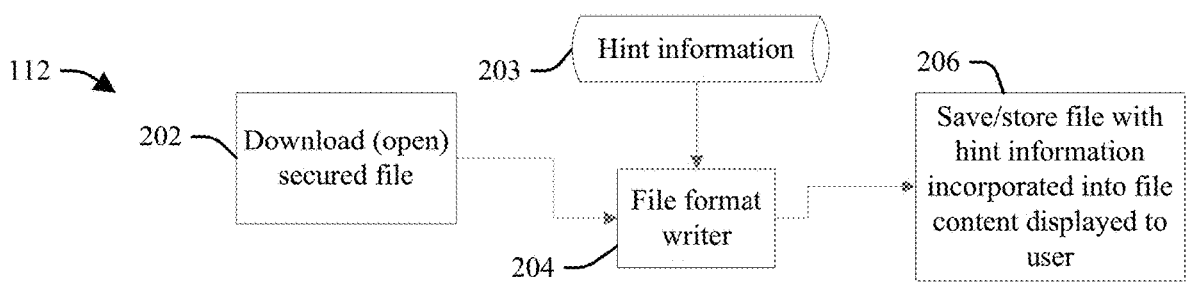
FIG. 7 is a flow chart illustration of another embodiment of the present invention.

FIG. 7 illustrates one embodiment of the present invention wherein a processor configured according to the present invention (configured processor) associates a generated hint to a secured file (at 112, FIG. 4) by incorporating or storing code representing the hint directly into the secured file. Thus, at 202 the configured processor downloads the secured file, wherein the downloading may include opening the file or otherwise gaining access to the file content in response to the user or the configured processor entering the password or presenting the security token required for access to the file.

At 204 the configured processor uses an appropriate content writer tool or application for the format or content of the secured file to directly incorporate the generated hint information 203 into the file content, and at 206 saves the file content with the incorporated, generated hint so that the hint is displayed when the user attempts to open the file content: for example, a pop-up window informs that user that a password is needed to open the file, and displays the hint within the window. In one example the secured file is a Portable Document Format (PDF) file, wherein at 204 the configured processor uses a PDF writer to provision the generated hint directly into the PDF file itself at 206, and wherein a PDF reader is enabled to read the generated hint information and display the hint to the user on an attempt to open the secured document.

Figure 8:
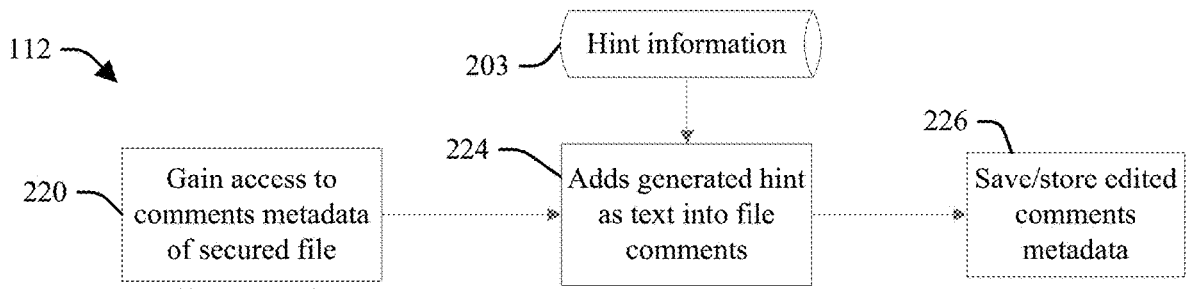
FIG. 8 is a flow chart illustration of another embodiment of the present invention.

FIG. 8 illustrates another, different embodiment of the present invention wherein a processor configured according to the present invention (configured processor) adds the hint information to the "comments" attribute or metadata of the secured file (at 112, FIG. 4). Thus, at 220 the configured processor gains access to comments metadata of the secured file (in some examples upon the user or the configured processor entering the password or presenting the security token required for access to the file), at 224 writes the generated hint information 203 as text content added into the file comments (via an appropriate text editor tool or application), and at 226 saves the edited comments as stored with the secured file. Thus, the generated hint information may be subsequently displayed along with other file properties or attributes, including while the file itself is still secured and unopened.

Figure 9:
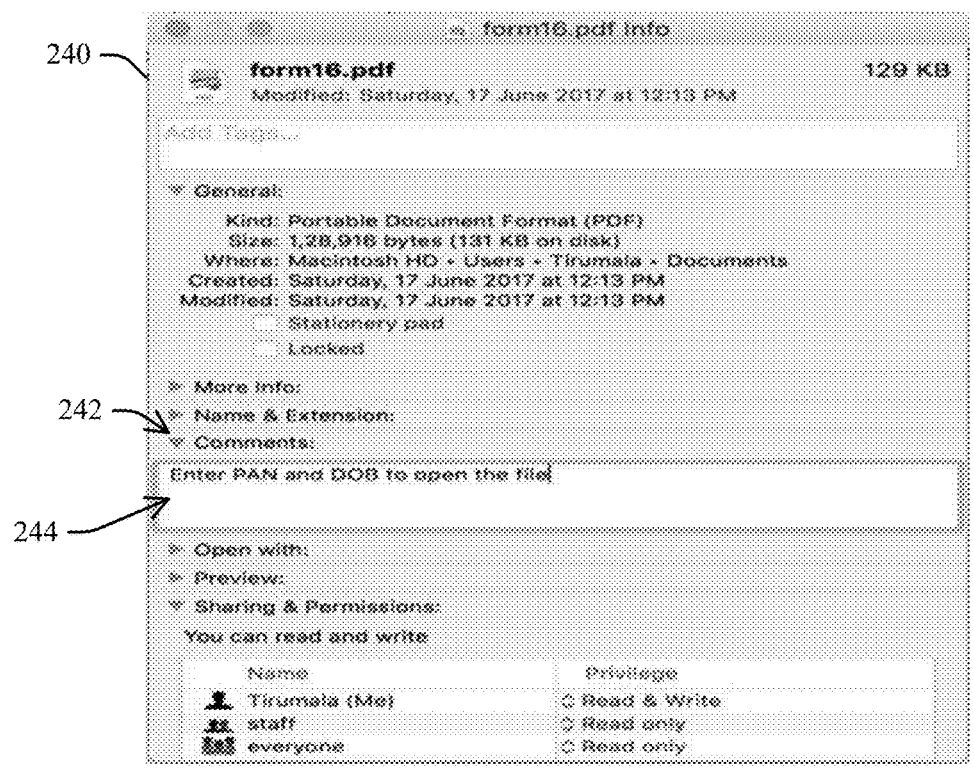
FIG. 9 is a graphic illustration of a graphical user interface window according to the present invention.

For example, FIG. 9 is a graphic illustration of a window 240 displayed to a user within a GUI display that conveys file properties of the secured and un-opened file PDF file entitled "form16.pdf". By hovering a mouse cursor over the "Comments" 242 section of the file properties a pop-up window 244 opens that displays the hint information written into the comments (at 224, FIG. 6): "Enter PAN and DOB to open the file".

Figure 10:
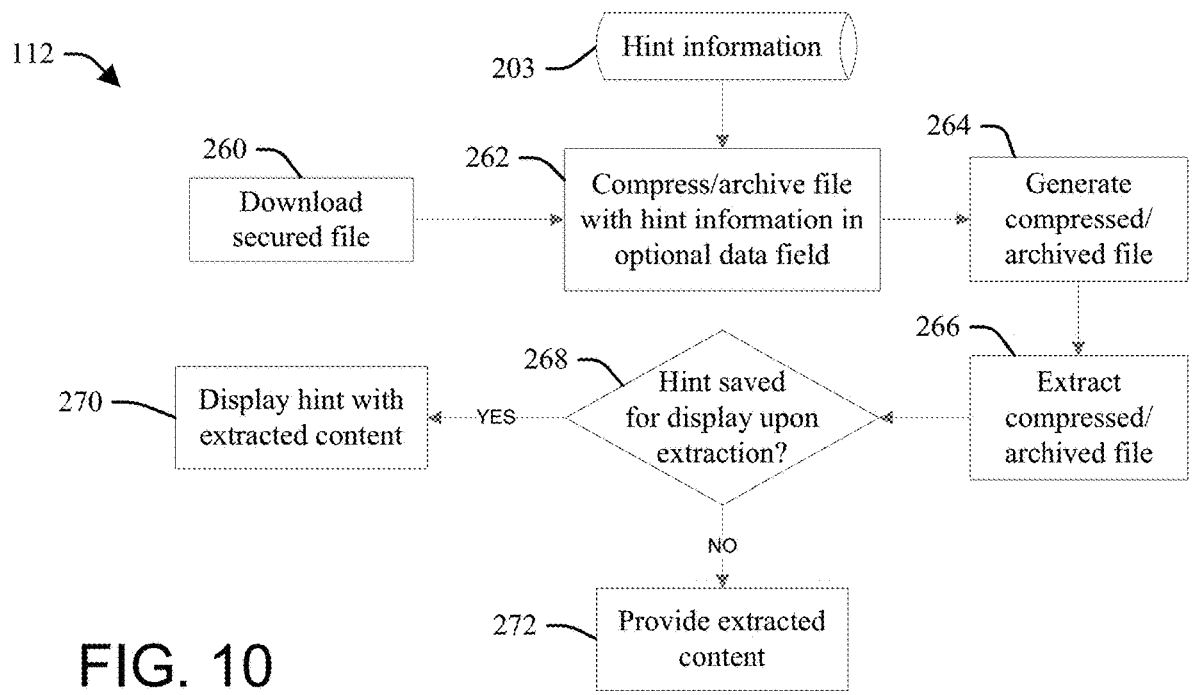
FIG. 10 is a flow chart illustration of another embodiment of the present invention.

FIG. 10 illustrates another, different embodiment of the present invention wherein a processor configured according to the present invention (configured processor) uses a compression, file archive utility or other tool or application to store the hint information along with the actual secured document (at 112, FIG. 4). Thus, at 260 the configured processor downloads the secured file and at 262 compresses or archives the file into a compressed or archived file format that includes the generated hint information 203 within an optional comments or file properties metadata field of the compressed/archived file generated at 264.

In one example the configured processor uses a "gzip" compression tool at 262 to populates an optional content field provided by the gzip tool with the hint information 203. Thus, when the configured processor subsequently extracts the compressed gzip file via use of the gzip tool at 266, the gzip tool mechanism determines at 268 whether any hint information is saved to the option field for display upon extraction (decompression or conversion of the secured file into its original or other accessible form): if so, the hint is displayed to the user with the extracted file content at 270, so that the user may use the hint to recall the password needed, or identify the location of a security token, needed to open the secure file; otherwise, the extracted file content is made accessible without a hint information display at 272.

Figure 11:
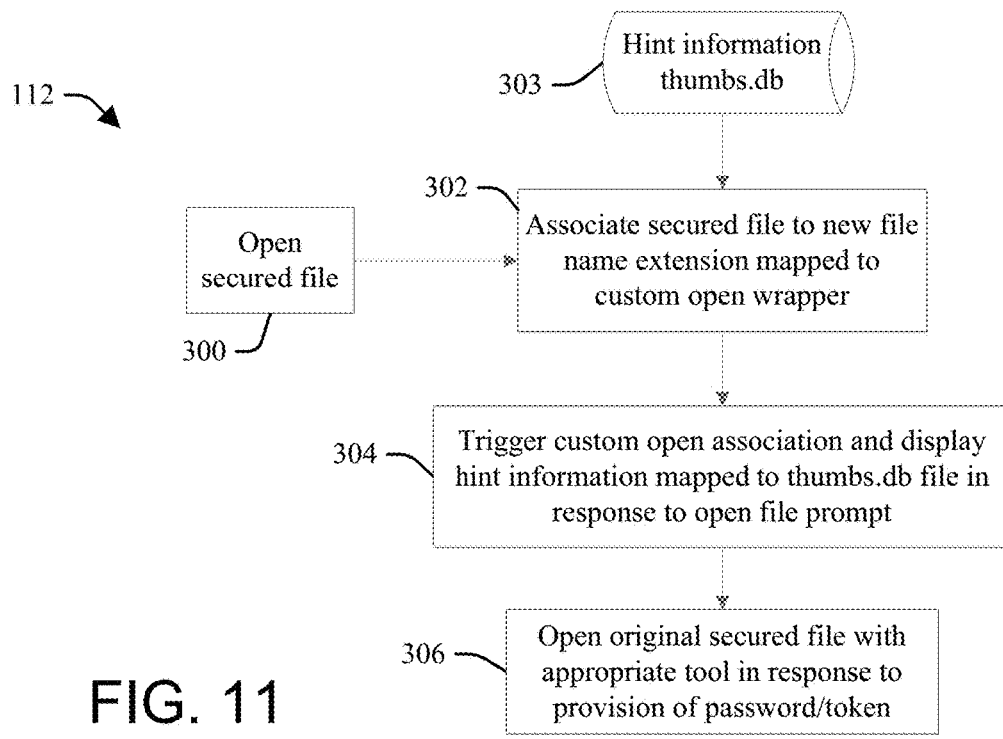
FIG. 11 is a flow chart illustration of another embodiment of the present invention.

FIG. 11 illustrates another, different embodiment of the present invention wherein a processor configured according to the present invention (configured processor) create an "open with" association with the secured file (at 112, FIG. 4). Thus, at 300 the configured processor opens the secured file (upon the user or the configured processor entering the password or presenting the security token required for access to the file), and at 302 associates the secured file to a new file name extension that is mapped to custom open wrapper that is linked to the password or token hint information stored in a "thumbs.db" file 303.

In one example a secured pdf file "xyz.pdf" is associated with a new file extension "xyz.pdfx" at 302, wherein a password hint for the secure file is stored in thumbs.db, and the new file name (.pdfx) extension is mapped to custom open wrapper "pdfx_wrapper.bat".

Thus, in response to receiving an input or prompt to open the secure file at 304 (for example, through selection of a file icon by a mouse cursor and entry of a double-click input), the configured processor triggers the custom "open with" association and displays the hint information mapped to the thumbs.db file (for example, via in a pop-up GUI window) to the user. At 306 the configured processor opens the original, password-protected (xyz.pdf) with the appropriate tool (for example, an PDF file reader tool) in response to a subsequent provision of the appropriate password or token by the user (as assisted in recall via the hint displayed to the user at 304).

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a secure code hint generator, the method comprising executing on a computer processor:

determining an occurrence of security word text content within body text content of an electronic message, wherein the security word text content is descriptive of a security token that is associated with a secured file referenced by the electronic message, wherein the security token is required to open the secured file;

distinguishing a subset ordered plurality of words of the body text content comprising the security word content from a remainder of an entirety of the body text content as a security phrase, as a function of determining via natural language processing that the security phrase is more related to describing the security token than the remainder body text content;

generating a hint comprising text content that differs from the security phrase and is chosen to reveal the security phrase text content to a user as a function of a knowledge context defined by user profile data;

storing the generated hint in a thumbs.db file; and associating the generated hint to the secured file for display to the user in response to a user request for access to the secured file, wherein associating the generated hint to the secured file comprises associating the secured file to a new file name extension that is mapped to a custom open wrapper file that is linked to the thumbs.db file.

2. The method of claim 1, wherein the associating the generated hint to the secured file comprises using an appropriate content writer tool for a format of the secured file to directly incorporate the generated hint into the secured file content, wherein a file reader tool for the format of the secured file displays the incorporated hint in a graphical user interface window in response to a user attempt to open the secured file.

3. The method of claim 1, wherein the associating the generated hint to the secured file comprises adding the hint text content to comments metadata of the secured file.

4. The method of claim 1, wherein the associating the generated hint to the secured file comprises uses a compression utility to store the hint with the secured file into a compressed file, wherein the hint is displayed in response to uncompressing the compressed file.

5. The method of claim 1, wherein the security token is a password, the method further comprising:
determining a text character attribute rule for text content of the password via natural language processing of the security phrase that specifies entry of a text character of the password that has an attribute that is selected from the group consisting of an alphanumeric character type, an upper case letter format and a lower case letter format; and
generating the hint to display content representing the text character attribute rule to the user.

6. The method of claim 5, further comprising:
determining a text character ordering rule for text content of the password via natural language processing of the security phrase that specifies an order or entry of different respective text content items that are selected from the group consisting of a date within the user profile data and a unique user identification indicia within the user profile data; and
generating the hint to display content representing the text character ordering rule to the user.

7. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the determining the occurrence of the security word text content within the body text content of the electronic message, the distinguishing the security phrase subset ordered plurality of words from the remainder of the entirety of the body text content, the generating the hint, and the associating the generated hint to the secured file for display to the user in response to the user request for access to the secured file.

8. The method of claim 7, wherein the computer-readable program code is provided as a service in a cloud environment.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
determines an occurrence of security word text content within body text content of an electronic message, wherein the security word text content is descriptive of a security token that is associated with a secured file that is referenced by the electronic message, wherein the security token is required to open the secured file;
distinguishes a subset ordered plurality of words of the body text content comprising the security word content from a remainder of an entirety of the body text content as a security phrase, as a function of determining via natural language processing that the security phrase is more related to describing the security token than the remainder body text content;
generates a hint comprising text content that differs from the security phrase and is chosen to reveal the security phrase text content to a user as a function of a knowledge context defined by user profile data;
stores the generated hint in a thumbs.db file; and
associates the generated hint to the secured file for display to the user in response to a user request for access to the secured file by associating the secured file to a new file name extension that is mapped to a custom open wrapper file that is linked to the thumbs.db file.

10. The system of claim 9, wherein the processor executes the program instructions stored on the computer-readable storage medium via the computer readable memory and thereby associates the generated hint to the secured file by using an appropriate content writer tool for a format of the secured file to directly incorporate the generated hint into the secured file content, wherein a file reader tool for the format of the secured file displays the incorporated hint in a graphical user interface window in response to a user attempt to open the secured file.

11. The system of claim 9, wherein the processor executes the program instructions stored on the computer-readable storage medium via the computer readable memory and thereby associates the generated hint to the secured file by adding the hint text content to comments metadata of the secured file.

12. The system of claim 9, wherein the processor executes the program instructions stored on the computer-readable storage medium via the computer readable memory and thereby associates the generated hint to the secured file by uses a compression utility to store the hint with the secured file into a compressed file, wherein the hint is displayed in response to uncompressing the compressed file.

13. The system of claim 9, wherein the security token is a password, and wherein the processor executes the program instructions stored on the computer-readable storage medium via the computer readable memory and thereby:
determines a text character attribute rule for text content of the password via natural language processing of the security phrase that specifies entry of a text character of the password that has an attribute that is selected from the group consisting of an alphanumeric character type, an upper case letter format and a lower case letter format; and
generates the hint to display content representing the text character attribute rule to the user.

14. The system of claim 13, wherein the processor executes the program instructions stored on the computer-readable storage medium via the computer readable memory and thereby:

determines a text character ordering rule for text content of the password via natural language processing of the security phrase that specifies an order or entry of different respective text content items that are selected from the group consisting of a date within the user profile data and a unique user identification indicia within the user profile data; and generates the hint to display content representing the text character ordering rule to the user.

15. A computer program product for cognitive robotic substitute tool selection and application, the computer program product comprising:

a non-transitory computer readable storage medium having computer readable program code embodied therewith, the computer readable program code comprising instructions for execution by a processor that cause the processor to:

determine an occurrence of security word text content within body text content of an electronic message, wherein the security word text content is descriptive of a security token that is associated with a secured file that is referenced by the electronic message, wherein the security token is required to open the secured file;

distinguish a subset ordered plurality of words of the body text content comprising the security word content from a remainder of an entirety of the body text content as a security phrase, as a function of determining via natural language processing that the security phrase is more related to describing the security token than the remainder body text content;

generate a hint comprising text content that differs from the security phrase and is chosen to reveal the security phrase text content to a user as a function of a knowledge context defined by user profile data;

store the generated hint in a thumbs.db file; and associate the generated hint to the secured file for display to the user in response to a user request for access to the secured file by associating the secured file to a new file name extension that is mapped to a custom open wrapper file that is linked to the thumbs.db file.

16. The computer program product of claim 15, wherein the computer readable program code instructions for execution by the processor further cause the processor to:

determine a text character attribute rule for text content of the password via natural language processing of the security phrase that specifies entry of a text character of the password that has an attribute that is selected from the group consisting of an alphanumeric character type, an upper case letter format and a lower case letter format; and generate the hint to display content representing the text character attribute rule to the user.

17. The computer program product of claim 16, wherein the computer readable program code instructions for execution by the processor further cause the processor to:

determine a text character ordering rule for text content of the password via natural language processing of the security phrase that specifies an order or entry of different respective text content items that are selected from the group consisting of a date within the user profile data and a unique user identification indicia within the user profile data; and generate the hint to display content representing the text character ordering rule to the user.

* * * * *